UNITED STATES PATENT OFFICE.

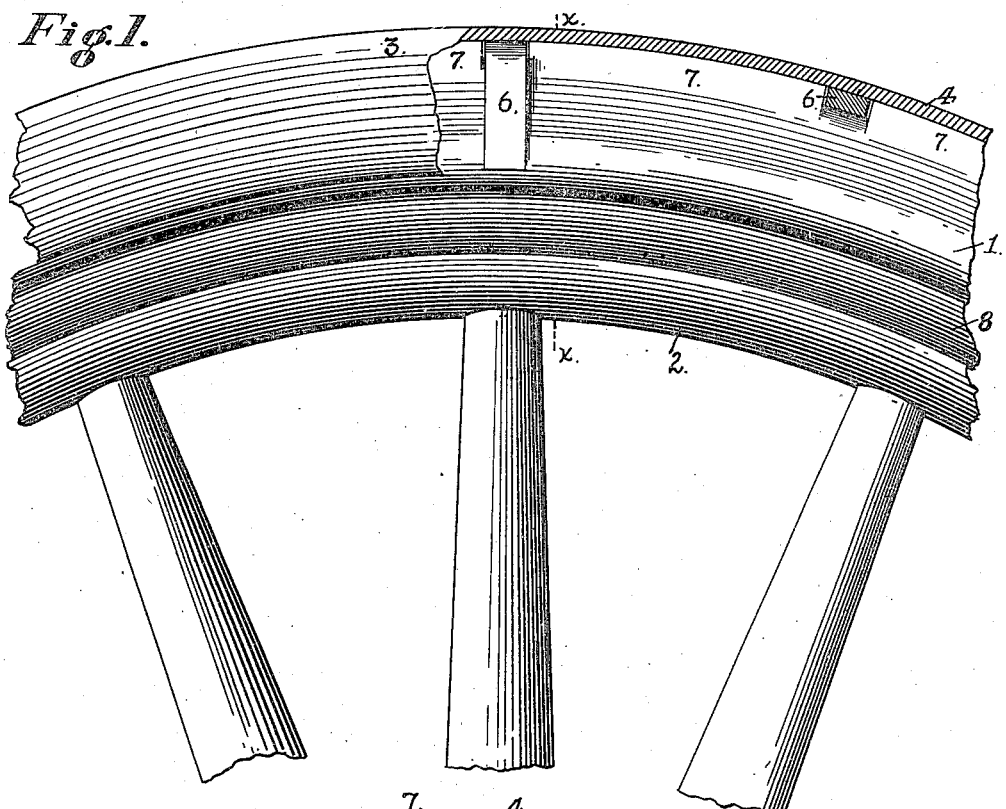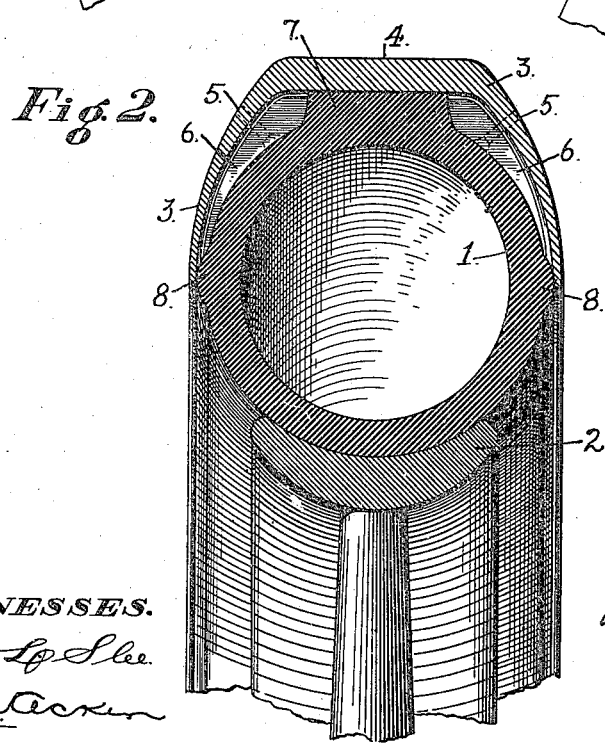

JOHN T. RYAN, OF VALLEJO, CALIFORNIA, ASSIGNOR TO AMERICAN TIRE ARMOR COMPANY, OF PHOENIX, ARIZONA, A CORPORATION OF ARIZONA.

ARMORED PNEUMATIC TIRE.

1,063,291. Specification of Letters Patent. Patented June 3, 1913.

Application filed March 26, 1908, Serial No. 423,292. Renewed September 19, 1911. Serial No. 650,256.

*To all whom it may concern:*

Be it known that I, JOHN T. RYAN, a citizen of the United States, residing at Vallejo, in the county of Solano and State of California, have invented certain new and useful Improvements in Armored Pneumatic Tires, of which the following is a specification.

My invention relates to the class of armored pneumatic-tires, and particularly to that type in which a non-puncturable metallic shield is applied to the danger-exposed area of the tire.

In the application of a metallic armor to a pneumatic-tire, especially when that armor is a relatively rigid piece of metal, that is, one not composed of articulated scales or plates involving flexibility, regard must be had to preserving the resiliency of the covered tire. In other words, the armor must be of such a character and so applied that while serving its purpose as an armor, it is really an adjunct to the tire, and not a rigid, inflexible tire in itself simply inclosing a pneumatic-tube; for, in such case, the tube would be of no service. Consequently, a metallic armor must be such, and so applied, that its function is subserved, without detracting from the purpose of the pneumatic-tire.

To accomplish this is the general object of my invention; and in so doing, further objects are to get a better bearing between the armor and tire, which while preserving the resiliency of the tire, will prevent any tendency of the armor to creep or slip thereon, will avoid excessive sound due to resonance, and will exclude foreign substances from between them.

To these ends my invention consists in the novel armored pneumatic-tire which I shall now fully describe, by reference to the accompanying drawings in which—

Figure 1 is a side view, partly broken, and in section, of my tire. Fig. 2 is a cross-section of the same on the line $x$—$x$ of Fig. 1.

1 is the pneumatic-tire, which, for illustration, is here shown as a single tube tire, though it is to be understood that said tube may also stand for and represent the outer casing of a double tube tire. I have shown the tire 1 as resting in the wheel-rim 2 without attempting to show means for securing it, as these form no part of my invention.

3 is a non-puncturable shield, preferably a metallic one, which is applied to the tire throughout its circumference and covers as much of its cross-section as is necessary, both to protect the danger-area of the tire, and to be itself held on by the inflation of said tire. The shield may have a well defined tread portion of any suitable character, such as 4, though this is not essential. The inner surface of the shield 3 does not, in the main, directly or immediately, under normal conditions, bear upon the tire, but said shield is either formed with or has secured to it, by rivets 5, as here shown, any suitable number of transverse or cross bearing strips 6, separated from each other by appreciable intervals, and disposed on and projecting from the inner surface of the shield, with a thickness greatest at the median plane and thence diminishing to each end, as seen in Fig. 2. These strips 6 bear throughout their length on the tire 1 and separate the shield therefrom. In the present invention, these strips 6 are not the only bearings which the shield has on the tire. There are also median circumferentially disposed bearings between the two, in the intervals between said strips 6. In the best form they consist of thickened portions 7 of the tire itself, which portions extend to the inner surface of the shield. These thickened portions are on the tire at intervals throughout its circumference and lie between the cross bearings 6, as seen in Fig. 1. Their width is such as to leave on each side of them clear spaces, as shown in Fig. 2, which clear spaces are bounded by the sides of the thickened portions, the sides of the tire, the sides of the shield and the cross bearings 6. The object of the cross bearings 6 is to provide normally vacant spaces into which the tire is permitted to expand by distortion under pressure, thereby preserving its resiliency and giving all the advantages to be derived from a pneumatic cushion. These normally vacant spaces need not, however, be the full area of the intervals formed by said cross bearings, but are best located and confined to the sides, because the distortion of the tire naturally lies in these lines, so that the full effect of such spaces may be had, at the same time that a more extensive bearing is given the shield on the tire, which results in a better and more secure application of the shield, preventing it from having any tendency to slip or crawl. The bearing thus formed by the middle portion of the cross strips 6 and by the intervening circumferential bearings 7, is practically continuous and is in a position to yield a firm connection between shield and tire and yet not to detract from or interfere with the purpose and advantage of the vacant spaces afforded by the spaced cross bearings 6.

Another improvement in my tire lies in providing or forming its sides with projecting annular ribs 8 which lie at the extremities of the shield 3. These form with said extremities a good joint to exclude foreign substances. Both this bearing at the ribs 8 and the circumferential tread bearings 7 have the further advantage of reducing and preventing the emission of a hollow sound due to resonance from the vacant spaces.

Having thus described my invention, what I claim as new and desire to secure by Letters Patent is—

An armored tire comprising a pneumatic tire provided with a plurality of circumferentially disposed separated ribs projecting from the periphery thereof, a non-puncturable rigid arch shaped shield overlying the tire and resting upon the circumferential ribs projecting therefrom, and a plurality of transversely disposed spaced bearings arranged between the outer surface of the tire and said shield and positioned between the circumferential ribs projecting from the tire, the circumferential ribs and bearings engaging the inner surface of the shield and being of a thickness to provide, when the shield is in normal position on the inflated tire, normally vacant spaces between the bearings into which the tire may expand under distorting pressure.

In testimony whereof I have signed my name to this specification in the presence of two subscribing witnesses.

JOHN T. RYAN.

Witnesses:
 WM. F. BOOTH,
 D. B. RICHARDS.